United States Patent [19]
Good

[11] Patent Number: 4,969,373
[45] Date of Patent: Nov. 13, 1990

[54] PEDAL ASSEMBLY

[76] Inventor: John M. Good, 404 B. Kenniston Dr., Austin, Tex. 78752

[21] Appl. No.: 120,934

[22] Filed: Nov. 16, 1987

[51] Int. Cl.$^5$ .............................................. G05G 1/14
[52] U.S. Cl. ................................. 74/594.4; 74/594.6; 188/24.11; 188/74
[58] Field of Search ...................... 74/594.1–594.6; 36/131, 132; 188/24.11, 1.12, 29, 74

[56] References Cited

U.S. PATENT DOCUMENTS

| | | | |
|---|---|---|---|
| 351,880 | 11/1886 | Merrill | 74/594.3 |
| 391,212 | 10/1888 | Torkelson | 74/594.5 |
| 616,167 | 12/1898 | Walker | 74/594.4 |
| 643,231 | 2/1900 | Parmiter | 188/24.11 |
| 1,731,312 | 10/1929 | Matheson | 188/74 |
| 2,544,471 | 3/1951 | Rither | 188/74 |
| 2,900,659 | 8/1959 | Snell | 188/74 |
| 2,905,275 | 9/1959 | Kostolecki et al. | 188/74 |
| 2,962,126 | 11/1960 | Legge | 188/74 |
| 2,972,163 | 2/1961 | Ross et al. | 188/74 |
| 4,103,563 | 8/1978 | Genzling | |
| 4,200,005 | 4/1980 | Mohr | |
| 4,244,239 | 1/1981 | Campagnolo | |
| 4,313,352 | 2/1982 | Okajima | |
| 4,335,628 | 6/1982 | Shimano | |
| 4,338,829 | 7/1982 | Ozaki | |
| 4,411,169 | 10/1983 | Takeda | |
| 4,591,027 | 5/1986 | Takamiya et al. | 188/24.11 |
| 4,665,767 | 5/1987 | Lassche | |
| 4,794,817 | 1/1989 | Romano | 74/594.6 |
| 4,819,504 | 4/1989 | Sampson | 74/594.6 |

FOREIGN PATENT DOCUMENTS

| | | | |
|---|---|---|---|
| 656067 | 1/1963 | Canada | 188/74 |
| 121309 | 11/1900 | Fed. Rep. of Germany | 74/594.4 |
| 913745 | 6/1954 | Fed. Rep. of Germany | 74/594.4 |
| 2025867 | 12/1971 | Fed. Rep. of Germany | 74/594.4 |
| 3722191 | 1/1988 | Fed. Rep. of Germany | 74/594.4 |
| 796362 | 4/1936 | France | 74/594.6 |
| 898379 | 4/1945 | France | 74/594.4 |
| 65898 | 3/1956 | France | 188/24.11 |
| 5837 | of 1904 | United Kingdom | 74/594.4 |
| 422895 | 1/1935 | United Kingdom | 188/24.11 |
| 2121129 | 12/1983 | United Kingdom | 188/24.11 |

*Primary Examiner*—Vinh Luong

[57] ABSTRACT

A pedal assembly having a pedal spindle, a pedal body rotatably mounted on the pedal spindle, and a brake assembly. The brake assembly includes a brake arm which includes a brake tab for engaging the pedal spindle. The brake arm is selectively positioned between a first position in which the brake tab engages the pedal spindle to restrict rotation of the pedal body and a second position in which the brake tab is disengaged from the pedal spindle. The brake arm is biased by a spring into the first position. A foot pad may be provided on the brake arm for actuation by the user and a pedal spindle insert may be located over the pedal spindle to engage the brake arm. The pedal spindle, brake tab and spindle insert may include multiple, serrated, ratcheted, pointed, or gripping surfaces to increase frictional engagement. Alternately, the brake assembly includes a resistance ring located on the pedal spindle, a spring for preventing rotation of the resistance ring, and a pawl located on the pedal body for engaging the resistance ring to restrict reverse relative rotation of the pedal body. A conversion kit is also provided for modifying a pedal assembly which includes a brake assembly having a resistance ring for locating on the pedal spindle, a spring for preventing rotation of the resistance ring, and a pawl locatable on the pedal body for engaging the resistance ring to restrict reverse relative rotation of the pedal body.

16 Claims, 11 Drawing Sheets

PEDAL ASSEMBLY

BACKGROUND OF THE INVENTION

1. Field of the Invention

The present invention relates generally to an improved pedal assembly for bicycles. More particularly, the present invention provides a pedal assembly which maintains the pedal body in a stationary position relative to the pedal spindle when the cyclist's foot is not on the pedal and which permits rotation of the pedal body about the pedal spindle when the cyclist's foot is in the proper pedaling position. The present invention is particularly useful for maintaining the orientation of a pedal having a toe clip mounted thereon.

2. Description of the Relevant Art

Pedal assemblies as known in the art generally include a pedal spindle rigidly connectable with a crank arm, and a pedal body rotatably journalled on the pedal spindle having a normal relative rotation about the pedal spindle. Such pedal assemblies are often designed and constructed so that only one or two sides of the pedal are intended for the cyclist's foot. Especially in the type of pedal assemblies where only one pedaling surface is intended for use, namely those designed for the attachment of toe clips, it is often the case that the pedaling surface is not in a convenient orientation for the cyclist to place his foot thereon. The cyclist must therefore rotate the pedal before placing his foot in the proper position on it. This procedure is likely to cause inconvenience or even injury in particular circumstances, as for example, during races or riding in city traffic which may require many stops and starts.

In the past, attempts have been made to fix the orientation of the pedal body on the spindle to allow rapid placement on the cyclist's foot on the pedal. Such devices have included magnets placed on the crank arm and the pedal such that the magnets will attract and position the pedal in relation to the crank arm. Such arrangements have numerous drawbacks, however, including that the placement of the magnets may cause an inconvenient position for pedal access and that the magnets add unnecessary weight and wind resistance. In addition, such pedal assemblies do not allow for the positioning of the pedal assembly in a wide variety of positions with respect to the crank arm.

There is thus a need for a pedal assembly which will allow fixation of the pedal assembly in any preferred relation to the crank arm and that will allow free rotation of the pedal body about the pedal spindle when pedaling. In addition, there is a need for such device which does not significantly add wind resistance or weight.

SUMMARY OF THE INVENTION

The present invention provides a pedal assembly in which is contained a brake member assembly means which: (1) causes the pedal body to remain in a stationary position relative to the pedal spindle when the cyclist's foot is not on the pedal; (2) permits the cyclist to adjust the pedal assembly with his foot or by overcoming the holding properties of the mechanism; and (3) permits rotation of the pedal body about the pedal spindle when the cyclist's foot is in the proper pedaling position on the pedal. The present invention also provides a conversion kit to modify an existing pedal assembly to include a brake member assembly means.

The brake member assembly means of the present invention is attached to the pedal body and selectively restricts rotation of the pedal body about the pedal spindle. In one embodiment, the brake member assembly means includes a brake arm member mounted on the pedal body and selectively positioned between a first position in which the brake arm member engages the pedal spindle and restricts rotation of the pedal body about the pedal spindle, and a second position in which the brake arm member is disengaged from the pedal spindle.

The brake member assembly means further includes biasing means engaging the brake arm member for urging the brake arm member into the first position in which the brake arm member engages the pedal spindle. The pedal assembly may further include a footpad adapted for actuation by the user of the pedal assembly to selectively position the brake arm member to the second position, and may further include a brake tab on the brake arm member which passes through an opening in the pedal body to engage the pedal spindle. Various surfaces may be employed on the pedal spindle and the brake arm member to improve the frictional engagement of one with the other.

In an alternative embodiment, the brake member assembly means of the present invention includes a resistance ring positioned on the pedal spindle and a biasing means for preventing rotation of the resistance ring on the pedal spindle. Contact means located on the pedal body engages the resistance ring to restrict rotational movement of the pedal body. In a preferred form, the contact means is located on a dustcap which is connectable to the pedal body.

DESCRIPTION OF THE PREFERRED EMBODIMENTS

Figure 1:
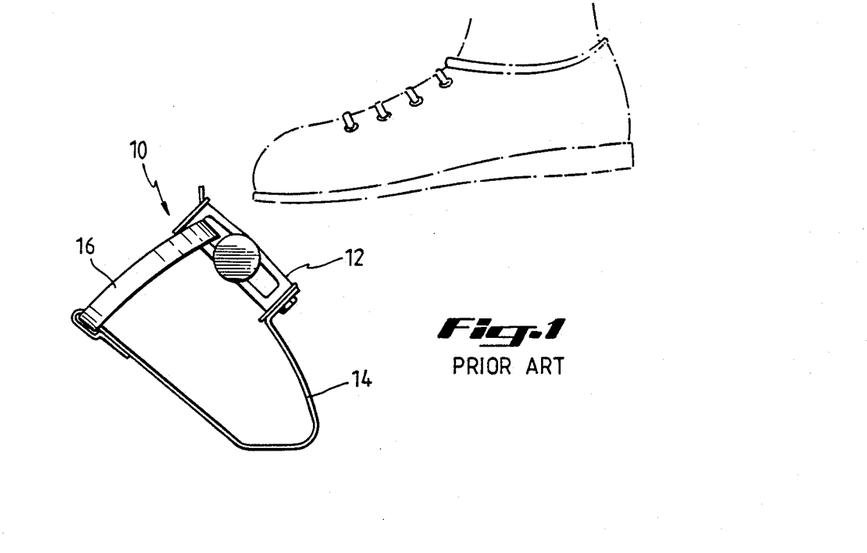
FIG. 1 is a side elevational view of a known pedal assembly having a toe clip mounted thereon.

FIG. 1 illustrates a conventional pedal assembly of known design. The pedal assembly 10 includes pedal body 12. Attached to the pedal body 12 is a toe clip assembly 14 having an adjustment strap 16. As illustrated, the conventional pedal assembly becomes oriented by gravity when the cyclist's foot is removed therefrom such that the toe clip assembly is below the pedal body. To properly orient the conventional pedal assembly, the cyclist must use his foot to rotate the pedal assembly and toe clip to the proper orientation.

The necessity in known pedal assemblies to thus rotate the pedal to the proper orientation causes inconvenience to the cyclist and may also result in accidents or injury. The cyclist's attention to the pedal assembly may cause a momentary loss of control of the bicycle or a momentary lapse of attention in the direction of movement. If the cyclist is unable to quickly engage his foot on the pedal properly, critical time may be lost in races and under conditions where the cyclist must move quickly.

Figure 2:
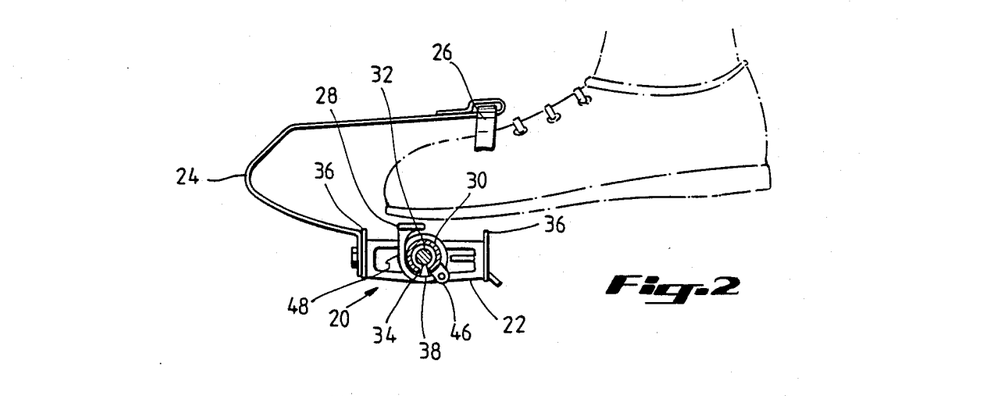
FIG. 2 is a side elevational view of a pedal assembly in accordance with the present invention in partial section.
Figure 3:
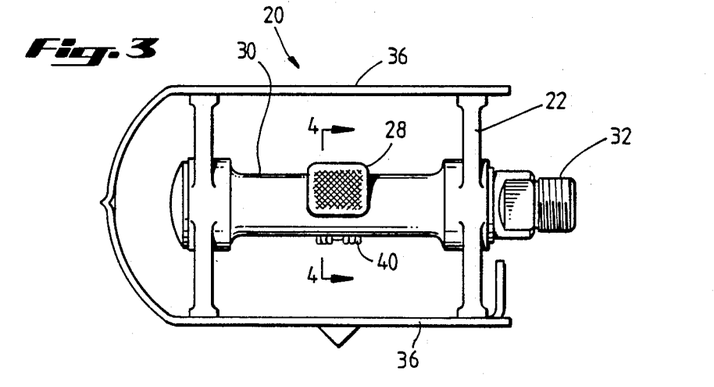
FIG. 3 is a top view of a pedal assembly in accordance with the present invention.
Figure 4:
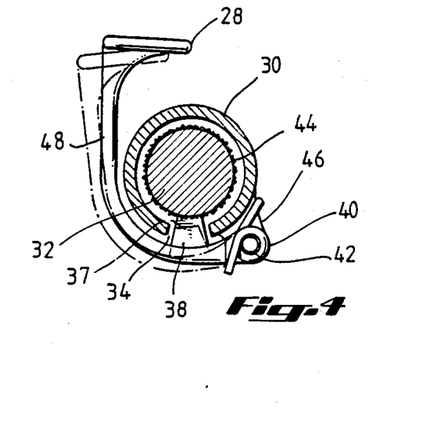
FIG. 4 is a sectional view of the pedal assembly of FIG. 3 showing the brake member assembly means thereof taken along line 4—4 of FIG. 3.

A pedal assembly in accordance with the present invention is illustrated in FIGS. 2-4. As shown, the pedal assembly 20 includes pedal body 22. Attached to the pedal assembly 20 is a toe clip assembly 24 having an adjustment strap 26. The pedal assembly 20 includes foot contact surfaces 36. As is known in conventional pedal assemblies, the pedal body 22 is rotatably journalled on the pedal spindle 32 and has a normal relative rotation about the pedal spindle 32.

A brake member assembly means in accordance with the present invention is also illustrated. The brake member assembly means shown includes a brake arm member 48 which acts against the pedal spindle 32 to prevent relative rotation of the pedal body 22 about the pedal spindle 32. The brake arm member 48 includes brake tab 38 which enters central pedal body 30 through opening 34 to engage the pedal spindle 32. The brake arm member 48 is hingedly mounted on the pedal body, and is selectively positioned between a first position in which the brake arm member engages the pedal spindle to restrict rotation of the pedal body about the pedal spindle, and a second position in which the brake arm member is disengaged from the pedal spindle. The brake arm member 48 is shown in the first position in FIG. 2 and is shown in a second position by the dashed lines in FIG. 4. The brake member assembly means is advantageously located near the central pedal body 30 of the pedal assembly 20.

The brake member assembly means also includes footpad 28. The footpad 28 extends above the contact surfaces 36 such that when the cyclist's foot is placed in the pedal assembly 20, the footpad 28 is depressed thereby releasing the brake arm member 48 from the pedal spindle 32 to allow free rotation of the pedal body 22 about the pedal spindle 32. The footpad 28 may also be sloped toward the rear of the pedal assembly to facilitate the positioning of the cyclist's foot on the footpad 28 and entry of the cyclist's foot in the pedal assembly.

The brake member assembly means shown in FIG. 2 further includes a biasing means (not shown) which urges the brake arm member 48 into contact with the pedal spindle 32. When the cyclist's foot is removed from the pedal assembly 20, thereby releasing footpad 28 and brake arm member 48, the biasing means causes the brake arm member 48 to engage the pedal spindle 32 to fix the position of the pedal assembly 20 with respect to the pedal spindle 32. The pedal assembly 20 will therefore remain in the same orientation to the pedal spindle 32 as when the cyclist's foot was removed.

FIG. 3 is a top view of the pedal assembly 20 shown in FIG. 2. The pedal assembly 20, as previously described, includes the pedal body 22 rotatably journalled on the pedal spindle 32. The pedal assembly 20 further includes the foot contact surfaces 36 and the central pedal body 30. The relationship of the footpad 28 to the central pedal body 30 is also illustrated. As shown, when a cyclist exerts pressure on the pedal assembly 20, the pressure is most concentrated on the central pedal body 30. For this reason, the footpad 28 is preferably located on or near the central pedal body 30 for ease and reliability of operation.

FIG. 4 illustrates in closer detail the brake member assembly means of the pedal assembly 20 shown in FIG. 2. As previously described, the brake arm member 48 includes the brake tab 38 which passes through the opening 34 in the central pedal body 30 to contact the pedal spindle 32. The footpad 28 is connected to the brake arm member 48 for actuation by the foot of the cyclist. The brake arm member 48 is hingedly attached to the central pedal body 30 by hinge members 46 and hinge pin 42. The brake arm member 48 is placed between the hinge members 46 which are connected to the central pedal body 30. A hole in the brake arm member 48 aligns with a hole in the hinged members 46 for placement of the hinge pin 42. Biasing means in the form of a coil spring 40 engages the brake arm member 48 and urges the brake arm member 48 and thus the brake tab 38 into a first position in contact with the pedal spindle 32. When a cyclist's foot is placed on the pedal assembly 20, the footpad 28 is depressed into a second position as shown in dashed lines, thereby moving the brake arm member 48 and disengaging the brake tab 38 from the pedal spindle 32, thereby allowing free rotation of the pedal assembly 20 about the pedal spindle 32. The pedal spindle 32 includes a grooved surface 44 which increases the frictional engagement of the pedal spindle 32 and the brake tab 38. Similarly, the brake tab 38 may include a grooved upper surface 37 to increase the frictional engagement of the pedal spindle 32 and the brake tab 38. As can be appreciated, a variety of surfaces may be employed for the brake arm member 48 or the brake tab 38, as well as for the spindle 32 to improve or modify the frictional engagement of the surfaces as described below in connection with FIGS. 13-16.

The constant force exerted by the biasing means in the brake member assembly means is great enough to fix the orientation of the pedal assembly 20 to the pedal spindle 32. In the case of a pedal assembly having a toe clip mounted thereon, the force of the biasing means would need to be adjusted accordingly to compensate for any increased weight. Even though the constant force exerted by the biasing means is sufficient to fix the orientation of the pedal body, the force is preferably not so great as to prevent an adjustment of the orientation by the cyclist. Therefore, the cyclist may freely select the orientation of the pedal assembly or may modify it according to his needs by moving the pedal assembly around.

The pedal assembly as thus shown and described in connection with FIGS. 2-4 can be made of a wide variety of materials. The choice of suitable materials will depend upon the desired length of wear and considerations of weight. As can be appreciated, the brake member assembly means may be made of lightweight materials such as plastics, nylon, or aluminum to minimize any additional weight caused by the assembly. In addition, the configuration of the brake member assembly means as described does not significantly effect the overall wind resistance attributable to the pedal assembly.

Figure 5:
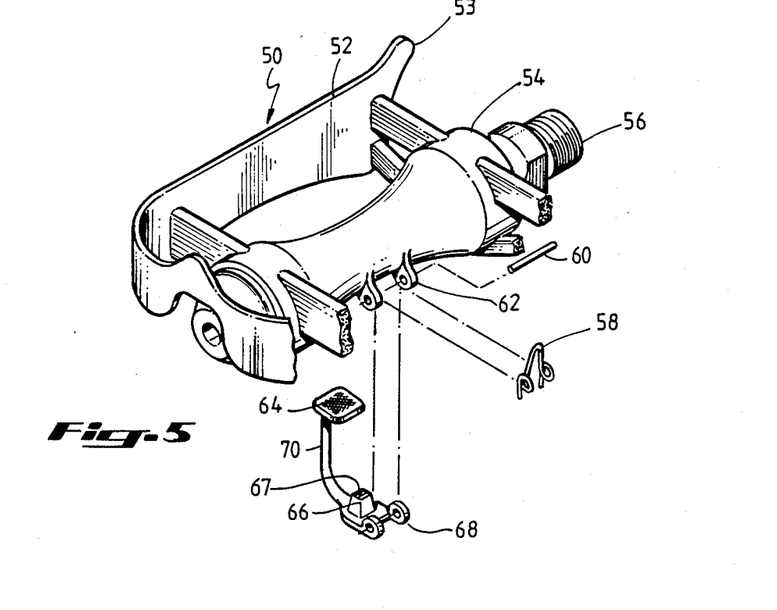
FIG. 5 is an exploded perspective view in partial section of a pedal assembly in accordance with the present invention.

FIG. 5 illustrates a further embodiment of a pedal assembly in accordance with the present invention. Pedal assembly 50 includes pedal body 53, central pedal body 54, and contact surfaces 52. The pedal assembly 50 is rotatably mounted on pedal spindle 56. FIG. 5 illustrates the connection of the brake arm member 70 to the central pedal body 54. Biasing means in the form of coil spring 58 is positioned to act against the central pedal body 54 and brake arm member 70 to urge the brake arm member 70 into engagement with the pedal spindle 56. The brake arm member 70 which includes brake tab 66 and hinge loops 68, is hingedly connected to the central pedal body 54 by hinge pin 60. The brake tab 66 may include grooved upper surface 67 as shown. Various surfaces may be employed for the pedal spindle, brake arm member, or brake tab to increase frictional engagement as described below in connection with FIGS. 13-16. A footpad 64 is also provided. The hinge pin 60 passes through holes in hinge members 62 and hinge loops 68. The operation of the hinge member assembly means is substantially as previously described.

Figure 6:
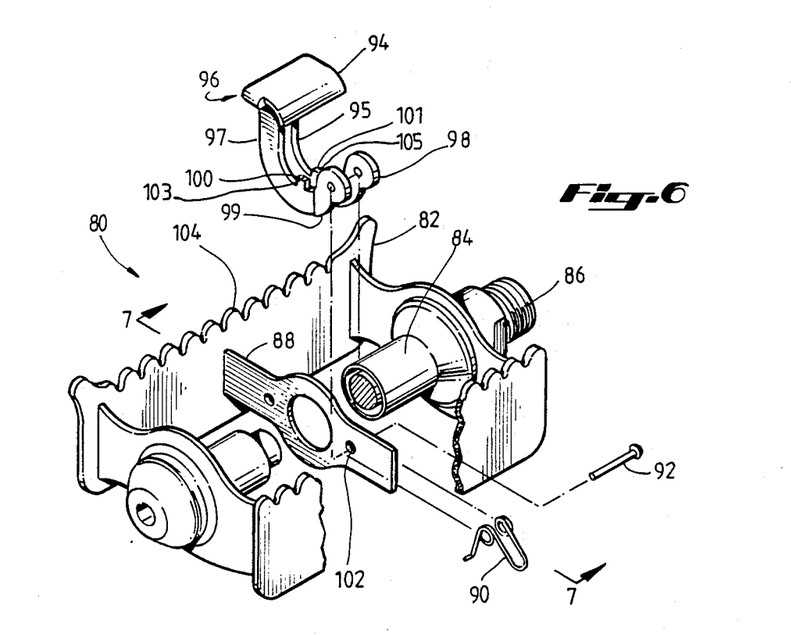
FIG. 6 is an exploded perspective view of a pedal assembly in accordance with the present invention in partial section.
Figure 7:
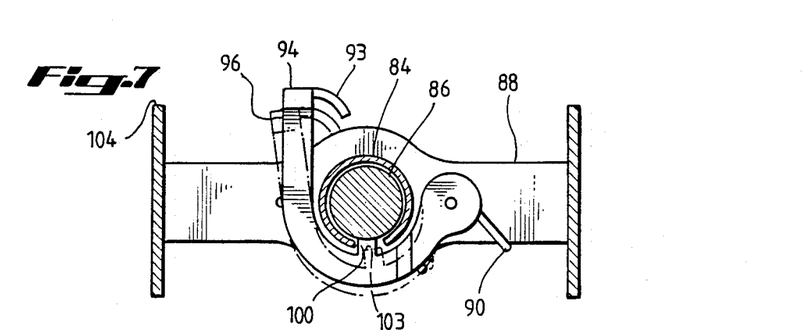
FIG. 7 is a sectional view of the brake member assembly means of the pedal assembly of FIG. 6 taken along line 7—7 of FIG. 6.

FIGS. 6 and 7 illustrate a further embodiment of a pedal assembly in accordance with the present invention. The pedal assembly 80 includes pedal body 82, central pedal body 84, contact surfaces 104 and central support bar 88. The brake arm member 96 is configured to be positioned over the central support bar 88 and thus is formed of two brake arm member components 95 and 97. The brake arm member components 95 and 97 have a gap between them for receiving central support bar 88. The brake arm member components 95 and 97 include brake tabs 101 and 100 which pass through openings in the central pedal body 84 to engage the pedal spindle 86. Various surfaces may be employed for upper surfaces 103 and 105 of the brake tabs 100 and 101, as may be employed for the pedal spindle, brake arm member, or brake tab to increase frictional engagement as described below in connection with FIGS. 13-16. The brake arm member components 95 and 97 may be joined by a footpad 94 as shown and include hinge loops 98 and 99. The footpad 94 includes rearwardly sloped surface 93 to facilitate the positioning of the cyclist's foot on the footpad 94 and to facilitate entry of the cyclist's foot in the pedal assembly. The hinge loops 98 and 99 have holes passing through them which aligns with hole 102 in central support bar 84. Biasing means in the form of coil spring 90 engages the brake arm member 96 to urge the brake arm member into contact with the pedal spindle 86. Hinge pin 92 completes the assembly by passing through hinge loops 98 and 99, coil spring 90 and hole 102.

As better illustrated in FIG. 7, the brake member assembly means of FIG. 6 operates in the manner as heretofore described. Footpad 94 extends slightly above the contact surface 104 such that placement of the cyclist's foot on the pedal assembly will depress the footpad 94 to release the brake arm member 96 from engagement with the pedal spindle 86. Biasing means 90 acts against the brake arm member 96 and the central support bar 88 to urge the brake tab 100 into engagement with the pedal spindle 86 when the cyclist's foot is removed to fix the orientation of the pedal assembly 80 with respect to the pedal spindle 86.

Figure 8:
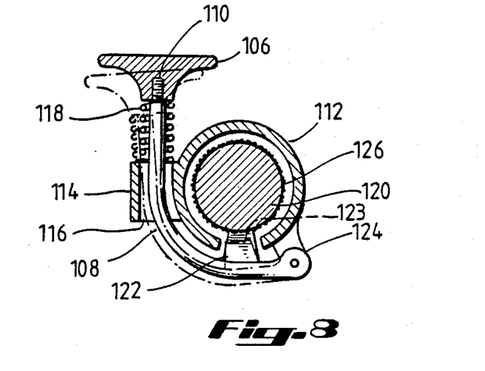
FIG. 8 is a sectional view of an alternate brake member assembly means for a pedal assembly in accordance with the present invention.

FIGS. 8-11 illustrate alternative embodiments of the brake member assembly means for a pedal assembly in accordance with the present invention. The brake pedal assembly means of FIG. 8 is connected to the central pedal body 112 of a pedal assembly. The central pedal body 112 rotates about the pedal spindle 120 in a conventional manner. Brake arm member 108 is hingedly attached to the central pedal body 112 at hinge 124. The brake arm member 108 passes through an opening 116 in the central pedal body 112 formed by extensions of a central pedal body 114. Threaded onto the brake arm member 108 is footpad 106. The footpad 106 engages screw threads 110 on the brake arm member 108. A biasing means is placed between the footpad 106 and the central pedal body 112 to urge the brake arm member and the brake tab 122 into contact with the pedal spindle 120. The biasing means shown is coil spring 118. The pedal spindle 120 may include a grooved surface 126 to increase frictional engagement of the brake tab 122. Upper surface 123 of the brake tab 122 may be formed to increase the frictional engagement of the pedal spindle 120 and the brake tab 122. Various surfaces may be employed for the pedal spindle, brake arm member, or brake tab to increase frictional engagement as described below in connection with FIGS. 13–16. The brake member assembly means operates in a similar manner to the embodiments previously discussed.

Figure 9:
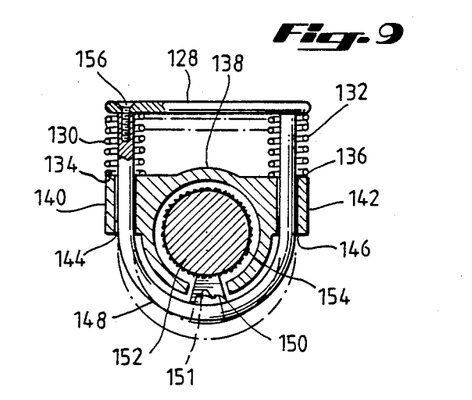
FIG. 9 is a sectional view of an alternate brake member assembly means for a pedal assembly in accordance with the present invention.

The brake member assembly means shown in FIG. 9 utilizes a u-shaped brake arm member 148. The brake arm member 148 passes through openings 144 and 146 formed in central pedal body 138 by extensions 140 and 142. A footpad 128 is connected to the upper ends of the brake arm member 148. Such connection may be by a screw 156 or any other attachment means of known technique. Biasing means in the form of springs 130 and 132 are interposed between the footpad 128 and the upper surfaces 134 and 136 of the pedal body extensions 140 and 142. The springs 130 and 132 urge the brake arm member 148 and the brake tab 150 into contact with the pedal spindle 152. Upper surface 151 of the brake tab 150 may be formed to increase the frictional engagement of the pedal spindle 152 and the brake tab 150. Various surfaces may be employed for the pedal spindle, brake arm member, or brake tab to increase frictional engagement as described below in connection with FIGS. 13–16. The pedal spindle 152 may include a grooved surface 154 to increase frictional contact with the brake tab 150.

Figure 10:
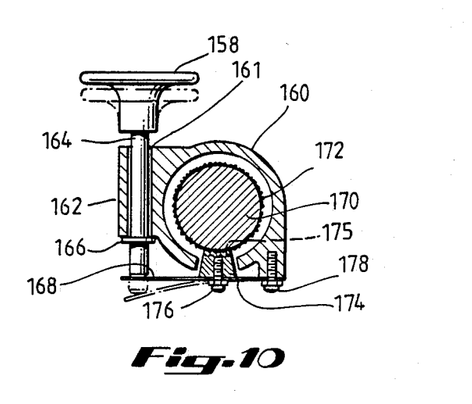
FIG. 10 is a sectional view of an alternate brake member assembly means for a pedal assembly in accordance with the present invention.

FIG. 10 illustrates yet another embodiment of a brake member assembly means for a pedal assembly in accordance with the present invention. The brake member assembly means shown in FIG. 10 is connected to central pedal body 160 which rotates about pedal spindle 170. Brake arm member 164 passes through opening 161 in the central pedal body 160 formed by central pedal body extension 162. Brake arm member 164 may be held in opening 161 by retaining ring 166 at the lower end of the opening 161. Connected to the brake arm member 164 is footpad 158. The brake arm member 164 rests on biasing means in the form of leaf spring 168. The leaf spring 168 is attached to the central pedal body 160 by screw 178. As can be appreciated, a wide variety of attachment means would suffice for this purpose. Secured to the leaf spring 168 is brake tab 174 by screw 176. Brake tab 174 may be secured by any suitable attachment means such as riveting, welding, adhesion, or the like. The leaf spring 168 urges the brake tab 174 into contact with the pedal spindle 170 which may include a grooved surface 172. Upper surface 175 of the brake tab 174 may be formed to increase the frictional engagement of the pedal spindle 170 and the brake tab 174. Various surfaces may be employed for the pedal spindle, brake arm member, or brake tab to increase frictional engagement as described below in connection with FIGS. 13–16. When the footpad 158 is actuated, the brake arm member 164 acts on the leaf spring 168 to disengage the brake tab 174 from the pedal spindle 170, thereby allowing free rotation of the pedal assembly about the pedal spindle.

Figures 11, 12:
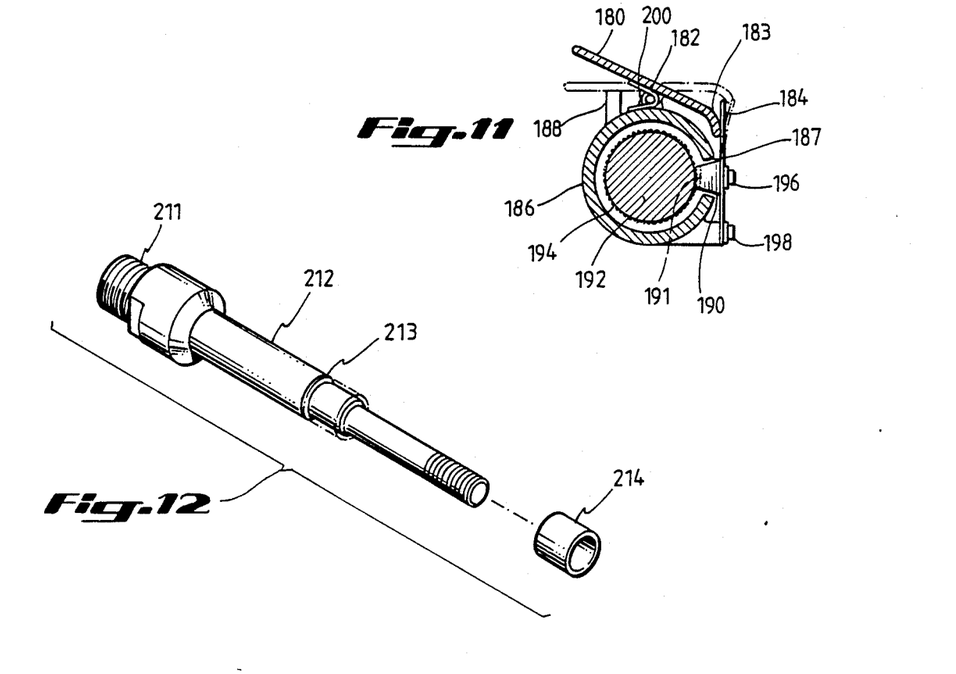
FIG. 11 is a sectional view of an alternate brake member assembly means for a pedal assembly in accordance with the present invention.
FIG. 12 is a perspective view of a pedal spindle showing a pedal spindle insert placed thereon shown in dashed lines.

FIG. 11 illustrates a further pedal assembly in accordance with the present invention. The brake member assembly means shown in FIG. 11 is connected to the central pedal body 186 which rotates about pedal spindle 192. Biasing means in the form of leaf spring 184 is connected to the central pedal body 186 by attachment means shown in the form of screw 198. Brake tab 190 is attached to the leaf spring 184 by screw attachment means 196. The leaf spring 184 urges the brake tab 190 into contact with the pedal spindle 192 through opening 187 in the central pedal body 186. The pedal spindle 192 may include a grooved surface 194 for increased frictional engagement with the brake tab 190. The brake tab 190 may be formed to increase the frictional engagement of the pedal spindle 192 and the brake tab 190. Various surfaces may be employed for the pedal spindle, brake arm member, or brake tab to increase frictional engagement as described below in connection with FIGS. 13–16. Also attached to the central pedal body 186 is footpad 180. The footpad 180 is pivotally mounted on the central pedal body 186 at hinge 200. The slope of the footpad 180 is directed toward the rear of the pedal assembly to facilitate the positioning of the cyclist's foot on the footpad 180 and to facilitate entry of the cyclist's foot in the pedal assembly. Interposed between the footpad 180 and the central pedal body 186 is biasing means in the form of coil spring 182. The footpad 180 includes camming surface 183 which acts against the leaf spring 184. In use, the footpad 180 is pivoted at hinge 200 to cause the camming surface 183 to act against the leaf spring 184, thereby disengaging the brake tab 190 from the pedal spindle 192. Pivotal movement of the footpad 180 is limited by stop pin 188. The coil spring 182 urges the footpad 180 to cause the camming surface 183 to reverse action against the leaf spring 184, thereby re-engaging the brake tab 190 with the pedal spindle 192 when the footpad 180 is released.

FIG. 12 illustrates a pedal spindle which may be used with a pedal assembly in accordance with the present invention. The pedal spindle 212 attaches to a crank arm by threads 211. A pedal spindle insert 214 may be provided which is locatable on pedal spindle 212 for engagement with a brake arm member as previously described. The pedal spindle 212 may include a shoulder 213 for locating the pedal spindle insert 214 in the proper position as generally indicated by the dotted lines in the figure.

Figure 13:
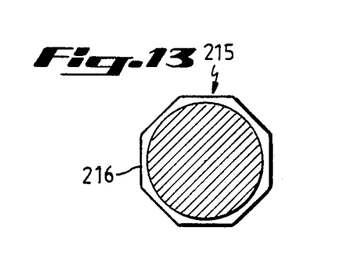
FIG. 13 is a sectional view of an alternate pedal spindle or a pedal spindle insert configuration.
Figure 14:
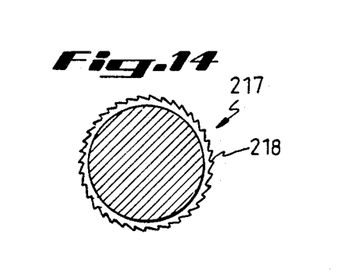
FIG. 14 is a sectional view of an alternate pedal spindle or a pedal spindle insert configuration.
Figure 15:
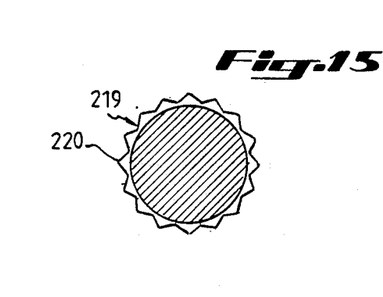
FIG. 15 is a sectional view of an alternate pedal spindle or a pedal spindle insert configuration.
Figure 16:
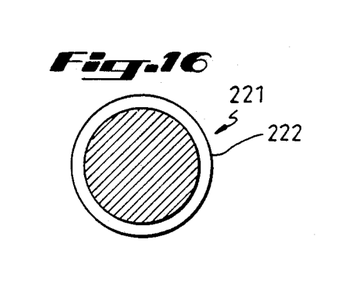
FIG. 16 is a sectional view of an alternate pedal spindle or a pedal spindle insert configuration.

FIGS. 13–16 demonstrate the various configurations that may be employed for the surfaces of the pedal spindle or the pedal spindle insert which are engaged by the brake arm member or brake tab. FIG. 13 illustrates a pedal spindle insert or pedal spindle 215 having multiple flat surfaces 216. FIG. 14 shows a pedal spindle insert or pedal spindle 217 having a serrated or ratcheted surface 218. FIG. 15 shows a pedal spindle or pedal spindle insert 219 having a pointed surface 220. FIG. 16 illustrates a pedal spindle or pedal spindle insert 221 having a gripping surface 222. The gripping surface 222 may be formed of a variety of materials such as plastic, rubber, or nylon. Each of the surfaces illustrated in FIGS. 13–16 act to modify or alter the frictional engagement of the brake arm member or brake tab with a pedal spindle or pedal spindle insert. Similar surfaces can be used on the brake arm member or brake tab of the brake member assembly means to similarly affect frictional engagement.

FIGS. 17–21 depict an alternative embodiment of a pedal assembly in accordance with the present invention. Beginning with FIG. 17, a pedal assembly 224 having central pedal body 228 and contact surface 230 is rotatably mounted on pedal spindle 226. An exploded view of the end portion of pedal assembly 224 is shown. The pedal spindle 226 has a threaded end 232 in which is cut a groove 234. Tightened onto the threaded end 232 of the pedal spindle 226 is lock nut 236, tanged washer 238, resistance ring 242, spring washer 244 and lock nut 246. Dustcap 248 is threaded onto the central pedal body 228 to enclose the internal components of pedal assembly 224. The tang 240 on the tanged washer 238 fits into the groove 234. As will be more fully discussed below, the spring washer 244 biases against the resistance ring 242 to prevent rotational movement of the resistance ring 242 about the pedal spindle 226.

The biasing force against the resistance ring 242 may be applied in numerous ways. For example, such biasing force may be applied by a spring washer as shown, a coil spring, or pliable washer. A pliable washer as may be useful for this purpose could be made of a sufficient thickness of plastic, rubber, nylon, or cloth.

Figure 17:
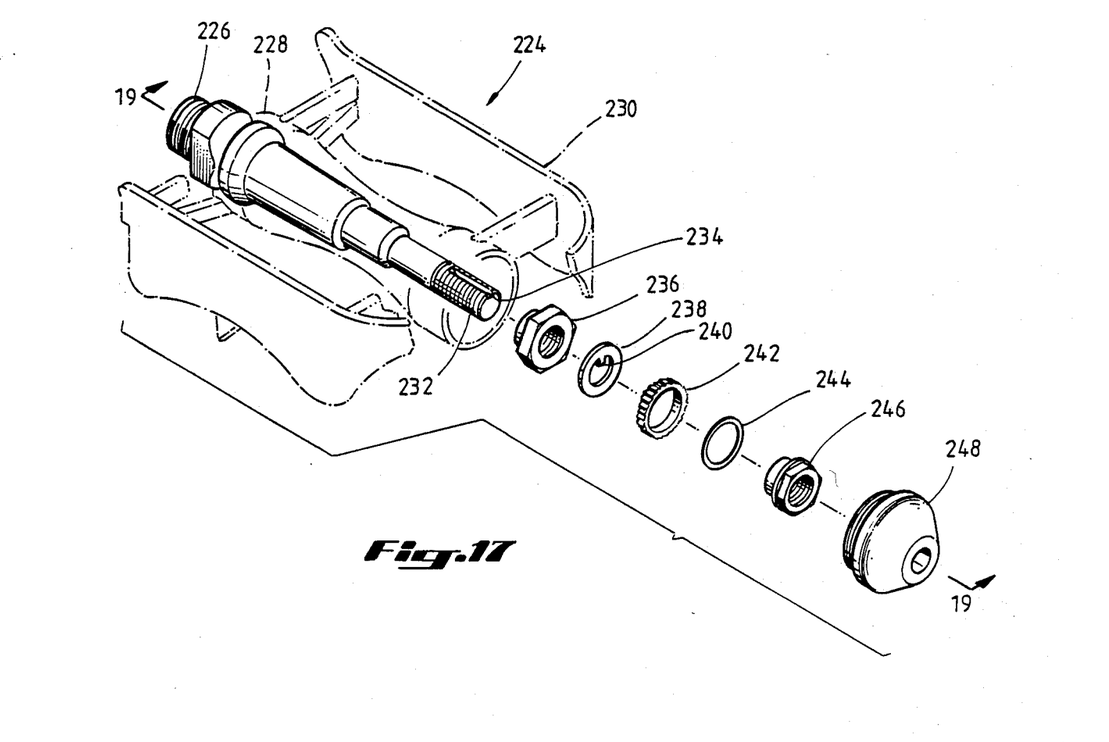
FIG. 17 is an exploded perspective view of an alternate embodiment of a pedal assembly in accordance with the present invention.
Figure 18:
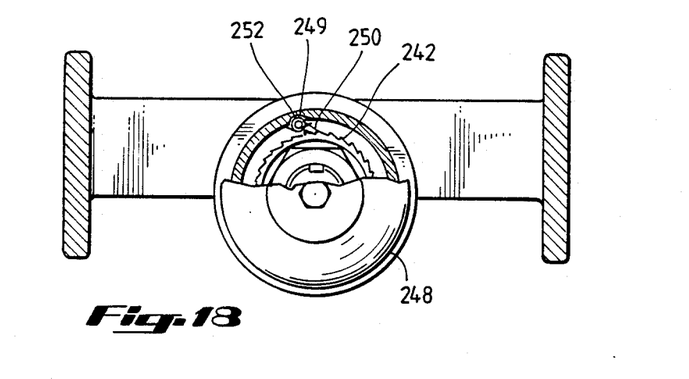
FIG. 18 is an end view in partial section of the pedal assembly of FIG. 17.

FIG. 18 is an end view of the pedal assembly of FIG. 17 showing a sectional portion of the dustcap 248. As shown, the dustcap 248 includes a contact means which engages the resistance ring 242. The contact means 249 includes a pawl 250 and spring biasing means 252. The contact means 249 is connected to the interior portion of the dustcap 248 such that when the dustcap 248 is fully threaded onto the central pedal body 228, it will engage the resistance ring 242.

Figure 19:
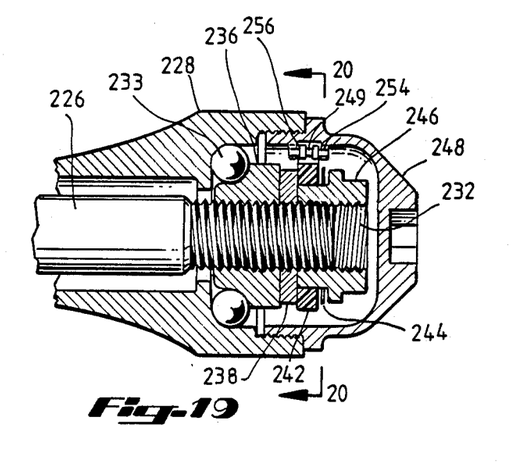
FIG. 19 is a sectional end view in perspective of the pedal assembly of FIG. 17 taken along line 19—19 of FIG. 17.

Turning now to FIG. 19 the side view of the end portion of the pedal assembly 224 is shown. Threaded onto the threaded end 232 of pedal spindle 226 are lock nut 236, tanged washer 238, resistance ring 242, spring washer 244, and lock nut 246. Dustcap 248 is threaded onto central pedal body 228 such that contact means 249 engages the resistance ring 242. Lock nut 236 rests against ball bearings 233 as in conventional pedal assemblies.

Figure 20:
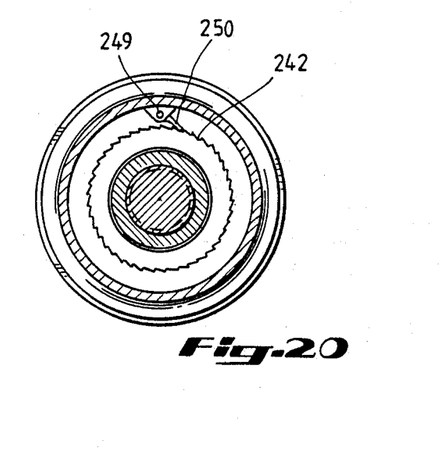
FIG. 20 is an end sectional view of the dustcap of the pedal assembly of FIG. 17 taken along line 20—20 of FIG. 19.

FIG. 20 is an end view of the pedal assembly of FIG. 19 along the reference line of FIG. 19. As previously indicated, contact means 249 includes ratchet 250 which engages resistance ring 242. As shown, resistance ring 242 includes a ratcheted surface such that the ratchet 250 of the contact means 249 will glide more freely in the forward direction to be more fully described below.

Figure 21:
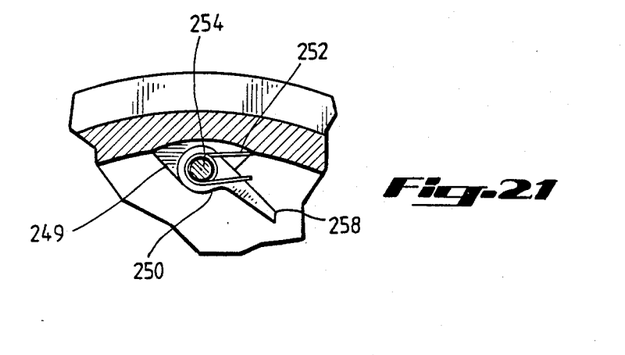
FIG. 21 is an isolated view of the contact means of the dustcap of the pedal assembly of FIG. 17.

FIG. 21 is an isolation of the contact means 249 of the pedal assembly of FIGS. 17-20. As shown, contact means 249 includes pawl 250 and spring biasing means 252. The ratchet 250 is held into place by pin 254 and includes tip 258 which engages the resistance ring 242 (not shown). The biasing means 252 urges the ratchet into contact with the resistance ring.

In operation, the pedal assembly of FIGS. 17-21 will operate to allow forward movement of the pedal assembly relative to the pedal spindle such that when the cyclist is pedaling the bicycle to go forward the pawl 250 will glide over the ratcheted surface of the resistance ring 242. The force of spring biasing means 252 on ratchet 250 is sufficient to engage the pawl 250 into the resistance ring 242 and thereby fix the orientation of the pedal assembly 224 in relation to the pedal spindle 226 when there is no additional force on the pedal assembly, i.e. by the cyclist's foot.

While the contact means 249 and the resistance ring 242 allow forward relative movement of the pedal assembly 224 over the pedal spindle 226, backward movement of the pedal assembly 224 is prevented due to the locking action of the ratchet 250 and the ratcheted surface of the resistance ring 242. In many cases, however, especially on bicycles which do not employ the use of a coaster brake, it is desirable to rotate the crank in the reverse direction by causing the pedals to move in backward relative motion to the pedal spindle. The present invention accomplishes this result through the biasing force exerted by the spring washer 244.

As previously discussed, the spring washer 244 biases the resistance ring 242 to restrict rotation of the resistance ring 242 about the pedal spindle 226. The biasing force of spring washer 244 is sufficient to maintain the orientation of the pedal assembly 224 when the pedal assembly is not acted upon by any additional force. If the cyclist desires to pedal the crank in the backward direction, he must simply overcome the biasing force of spring washer 244. When this is done, ratchet 250 will lock in the ratcheted surface of resistance ring 242 and the resistance ring 242 will slip in the reverse direction. Of course, if it is desired that the crank never be rotated in the reverse direction, the spring washer 244 could be eliminated from the assembly and the lock nut 246 could be securely tightened against the resistance ring 242 or formed as an integral part of the locknut 246.

Figure 22:
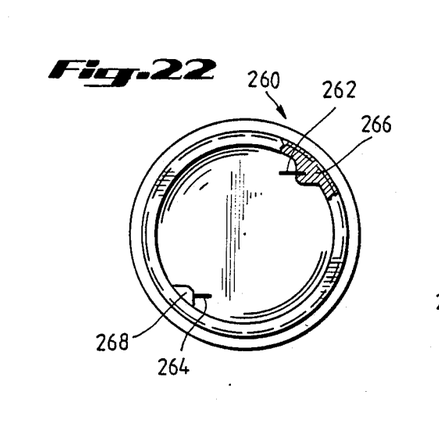
FIG. 22 is a sectional view of a dustcap having an alternate contact means.
Figure 23:
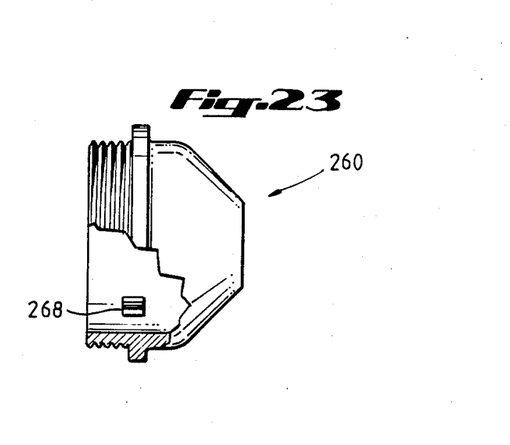
FIG. 23 is a side sectional view of the dustcap of FIG. 22.

FIGS. 22 and 23 illustrate an alternate form of the contact means. The contact means shown in FIG. 22 includes two mounting bulges 266 and 268 and two leaf springs 262 and 264. The leaf springs 262 and 264 engage the resistance ring 242 in a manner similar to that of the ratchet 250. FIG. 23 is a side view of the dustcap 260 of FIG. 22 illustrating the relative location of the mounting bulge 268 for the leaf spring 264.

As will be appreciated, the contact means may be connected to the dustcap as illustrated or may be connected to an interior surface of the central pedal body. In either case, the contact means will be in an alignment to engage the resistance ring.

The internal components of the pedal assembly as thus disclosed, may comprise a conversion kit for modifying an existing pedal assembly. For example, a resistance ring, biasing means, and contact means could be provided for suitable placement on an existing pedal assembly. If necessary, the placement lock nuts could also be provided given that there may be limited threading space on the spindle. In addition, a replacement dustcap having a contact means therein could be provided for the conversion kit. As will be appreciated by those of skill in the art, a conversion kit's components will be readily sized and threaded to take the place of the existing internal pedal components to provide a brake member assembly means in accordance with the present invention.

Figures 24, 25, 26:
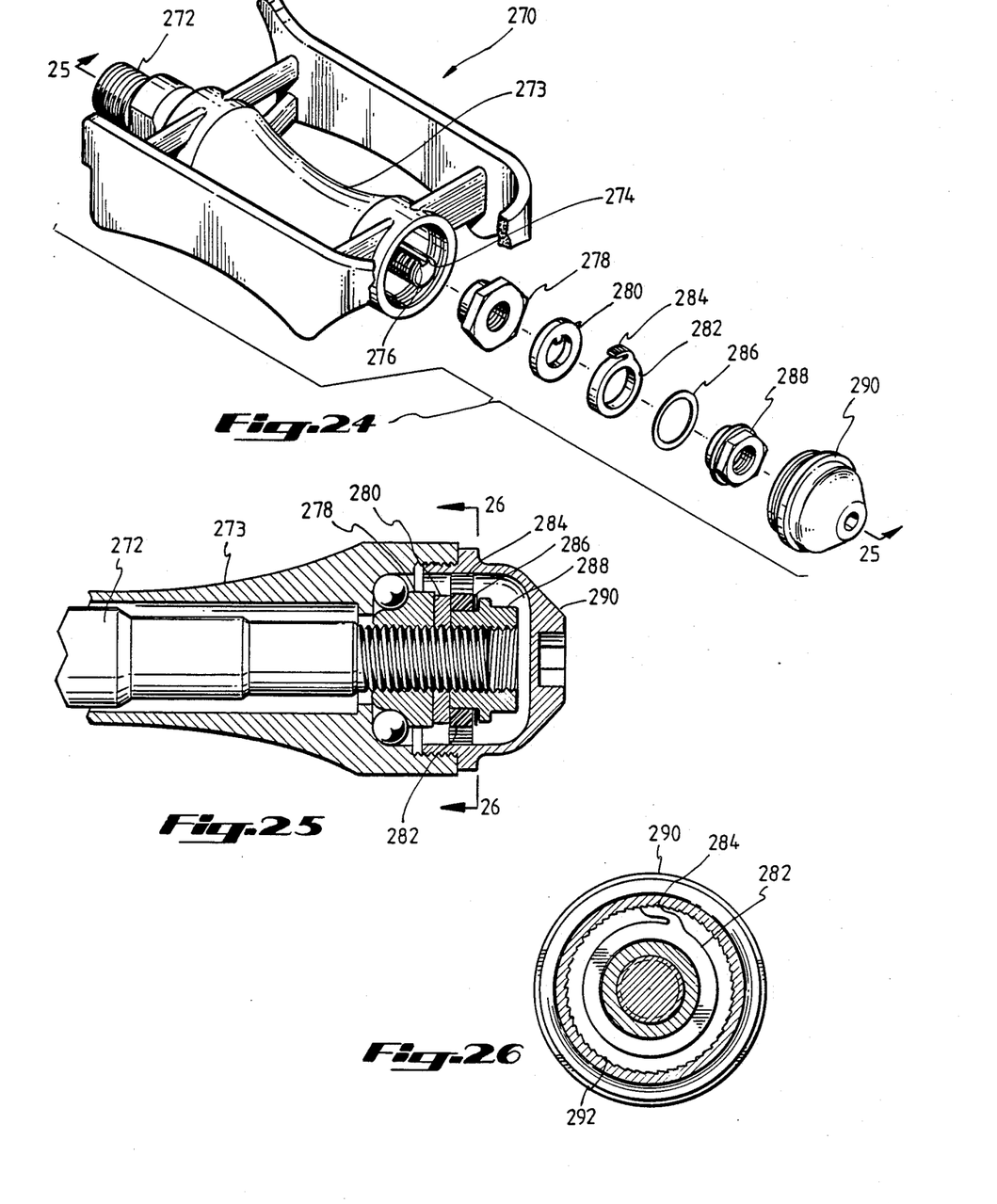
FIG. 24 is an exploded perspective view of an alternate embodiment of a pedal assembly in accordance with the present invention.
FIG. 25 is an end elevational view in partial section of the pedal assembly of FIG. 24 taken along line 25—25 of FIG. 24.
FIG. 26 is an end sectional view of the pedal assembly of FIG. 24 taken along line 26—26 of FIG. 25.

FIGS. 24-26 illustrate an alternative embodiment of the brake member assembly means of the present invention. Pedal assembly 270, having central pedal body 273 is rotatably mounted on pedal spindle 272. The pedal spindle 272 includes threaded end 274 having groove 276 therein. Applied to the threaded end 274 of the pedal spindle 272 are lock nut 278, tanged washer 280, resistance ring 282, spring washer 286 and lock nut 288. Enclosing the components thus described is dustcap 290. The resistance ring 282 includes a brake arm member 284 which engages a contact means as will be more fully described below.

FIG. 25 illustrates the relationship of the pedal assembly components of FIG. 24. Threaded on to the pedal spindle 272 is lock nut 278, tanged washer 280, resistance ring 282, spring washer 286 and lock nut 288.

Dustcap 290 is threaded into the central pedal body 273 as shown.

FIG. 26 illustrates the relationship between the resistance ring 282 and the contact means 292 in dustcap 290. The brake arm member 284 of the resistance ring 282 engages the contact means 292 in a ratchet relation to allow forward relative rotation of the pedal body on the pedal spindle. Reverse relative rotation of the pedal body is restricted by the direction of the ratcheted surface 292. As described above, the pedal assembly can be rotated in the reverse direction by overcoming the force applied by the spring washer 286 to resistance ring 282. When this force is exceeded, the resistance ring will slip in the reverse direction about the pedal spindle 272.

Figure 27:
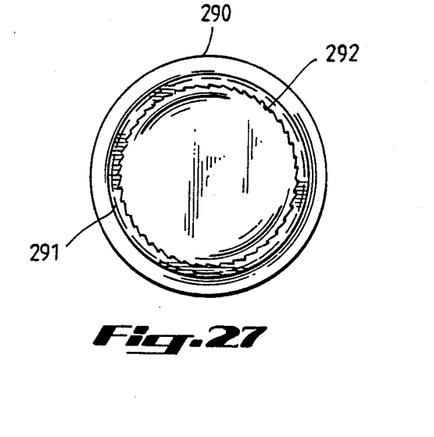
FIG. 27 is a sectional view of the dustcap of the pedal assembly of FIG. 24.
Figure 28:
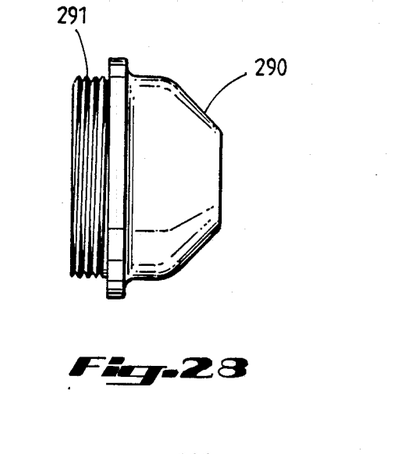
FIG. 28 is an elevational view of the dustcap of the pedal assembly of FIG. 24.

FIGS. 27 and 28 illustrate the dustcap 290 of the pedal assembly of FIG. 24. The dustcap 290 includes a threaded end 291 which engages the central pedal body 273 (not shown). Inside the dustcap 290 is the contact means 292 which is a ratcheted surface. When the dustcap 290 is located on the central pedal body 273, the surface 292 is positioned for engagement with the brake arm member 284 of the resistance ring 282.

Figure 29:
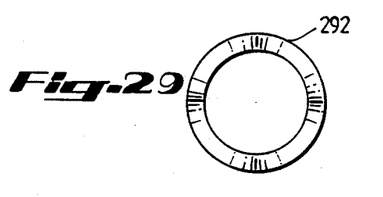
FIG. 29 is a perspective view of the biasing means of the pedal assembly of FIG. 24.
Figure 30:
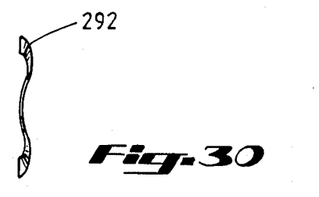
FIG. 30 is a side view of the biasing means of FIG. 29.

FIGS. 29 and 30 illustrate a spring washer 292 which may be used to bias the resistance ring as previously described. The spring washer 292 includes a waved configuration which creates the spring force exerted on the resistance ring. As will be apparent to those of skill in the art, a variety of biasing means may be employed to bias the resistance ring. For example, a conical spring washer or a coil spring could be used for this purpose.

Figure 31:
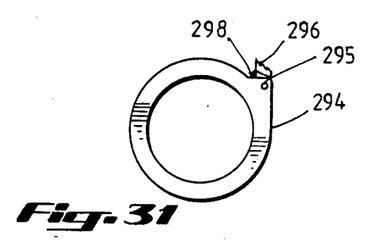
FIG. 31 is an elevational view of the resistance ring of the pedal assembly of FIG. 24.
Figure 32:
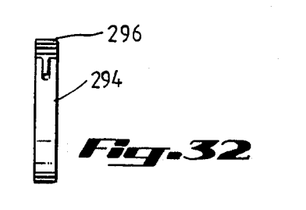
FIG. 32 is a side view of the resistance ring of FIG. 31.
Figure 33:
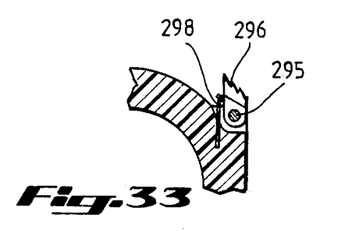
FIG. 33 is a sectional view of the resistance ring of FIG. 31.

FIGS. 31-33 illustrate an alternative embodiment for a resistance ring 294 to be used in the pedal assembly of FIG. 24. The resistance ring 294 includes brake member 296 hinged at hinge 295. Spring biasing means 298 urges brake arm member 296 away from resistance ring 294 and into engagement with a contact means. FIG. 32 is a side view of resistance ring 294 and brake arm member 296. FIG. 33 is an isolation of the brake arm member 296 showing the hinge 295 and the spring biasing means 298.

Figure 34:
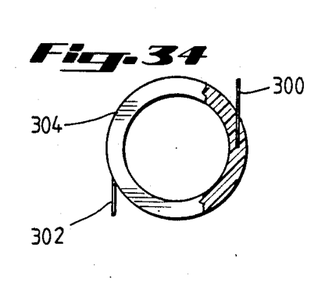
FIG. 34 is an alternative embodiment of the resistance ring for use in a pedal assembly in accordance with present invention.

FIG. 34 shows an alternative embodiment of the resistance ring 304 having brake arm members 300 and 302 in the form of leaf springs. The leaf springs 300 and 302 engage the contact means to prevent rotation of the pedal assembly as previously described.

What is claimed is:

1. A pedal assembly attachable to a crank arm and adapted for imparting rotary motion thereto, the assembly comprising:
   a pedal spindle rigidly connectable to a crank arm;
   a central pedal body rotatably mounted on the pedal spindle;
   a brake member assembly means attached to the pedal body for selectively restricting rotation of the pedal body about the pedal spindle, the brake member assembly means including a brake arm member attached to the pedal body by a hinge means and selectively positioned between a first position in which a brake tab engages the pedal spindle and restricts rotation of the pedal body about the pedal spindle, and a second position in which said brake tab is disengaged from the pedal spindle thereby unrestricting rotation of the pedal body about the pedal spindle; and
   biasing means interfased between the brake arm member and the pedal body for urging the brake member into the first position.

2. A brake assembly in accordance with claim 1 wherein the pedal body includes an opening therein and the brake arm member includes said brake tab receivable in the opening in the pedal body, the brake tab adapted to engage the pedal spindle when the brake arm member is in the first position.

3. A pedal assembly in accordance with claim 1 wherein the pedal spindle includes a grooved outer surface to engage the brake arm member.

4. A pedal assembly in accordance with claim 2 or 3 wherein the brake tab includes a grooved upper surface to engage the pedal spindle.

5. A pedal assembly in accordance with claim 1 wherein the pedal spindle includes a serrated outer surface to engage the brake arm member.

6. A pedal assembly in accordance with claim 1 wherein the pedal spindle includes a pointed outer surface to engage the brake arm member.

7. A pedal assembly in accordance with claim 1 wherein the pedal spindle has a gripping outer surface to engage of the brake arm member.

8. A pedal assembly in accordance with claim 7 wherein the gripping surface is made of rubber.

9. A pedal assembly in accordance with claim 7 wherein the gripping surface is made of plastic.

10. A pedal assembly in accordance with claim 7 wherein the gripping surface is made of nylon.

11. A pedal assembly attachable to a crank arm and adapted for imparting rotary motion thereto, the assembly comprising:
    a pedal spindle rigidly connectable to a crank arm;
    a pedal body rotatably mounted on the pedal spindle;
    a brake member assembly means attached to the pedal body for selectively restricting rotation of the pedal body about the pedal spindle, the brake member assembly means including a brake arm member attached to the pedal body by a hinge means and selectively positioned between a first position in which a brake tab engages the pedal spindle and restricts rotation of the pedal body about the pedal spindle, and a second position in which said brake tab is disengaged from the pedal spindle thereby unrestricting rotation of the pedal body about the pedal spindle; and
    biasing means interfased between the brake arm member and the pedal body for urging the brake member into the first position; and
    a footpad operably connected to the brake arm member, the footpad capable of actuation by the user of the pedal assembly to selectively position the brake arm member to the second position and further being sloped to facilitate the positioning of the foot of the user thereon.

12. A pedal assembly in accordance with claim 11 wherein the pedal body includes an opening therein and the brake arm member includes said brake tab receivable in the opening in the pedal body, the brake tab adapted to engage the pedal spindle when the brake arm member is in the first position.

13. A pedal assembly in accordance with claim 11 wherein the pedal spindle includes a grooved outer surface to engage the brake arm member.

14. A pedal assembly in accordance with claim 12 or 13 wherein the brake tab includes a grooved upper surface to engage the pedal spindle.

15. A pedal assembly attachable to a crank arm and adapted for imparting rotary motion thereto, the assembly comprising:

a pedal spindle rigidly connectable to a crank arm;
a pedal body rotatably mounted on the pedal spindle;
a brake member assembly means attached to the pedal body for selectively restricting rotation of the pedal body about the pedal spindle, the brake member assembly means including a brake arm member operably connected to the pedal body and selectively positioned between a first position in which a brake tab engages the pedal spindle and restricts rotation of the pedal body about the pedal spindle, and a second position in which said brake tab is disengaged from the pedal spindle thereby unrestricting rotation of the pedal body about the pedal spindle; and biasing means operably connected to the brake arm member for urging the brake member into the first position; and a footpad pivotally connected to the pedal body and capable of actuation by the user of the pedal assembly such that the footpad selectively engages the brake arm member to position the brake arm member to the second position and further being sloped to facilitate the positioning of the foot of the user thereon.

16. A pedal assembly in accordance with claim 15 wherein the biasing means urges the footpad to pivot into a position where the brake arm member is in the first position.

* * * * *